(12) United States Patent
Schamber et al.

(10) Patent No.: US 8,098,168 B2
(45) Date of Patent: Jan. 17, 2012

(54) REMOTE COMMUNICATIONS FEEDBACK FOR UTILITY METER

(75) Inventors: Steven Schamber, Lafayette, IN (US); Richard Morris, Lafayette, IN (US); David Allen Stenberg, Lebanon, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 819 days.

(21) Appl. No.: 12/194,579

(22) Filed: Aug. 20, 2008

(65) Prior Publication Data

US 2010/0045479 A1 Feb. 25, 2010

(51) Int. Cl.
G08C 9/16 (2006.01)
(52) U.S. Cl. .................................. 340/870.02
(58) Field of Classification Search .............. 340/870.02
See application file for complete search history.

(56) References Cited

U.S. PATENT DOCUMENTS

| | | | |
|---|---|---|---|
| 4,301,508 A | 11/1981 | Anderson et al. | |
| 4,803,632 A | 2/1989 | Frew et al. | |
| 5,115,190 A | 5/1992 | Varney, Jr. | |
| 5,477,216 A | 12/1995 | Lee, Jr. et al. | |
| 5,745,114 A | 4/1998 | King et al. | |
| 6,081,204 A | 6/2000 | Lavoie et al. | |
| 6,088,659 A | 7/2000 | Kelley et al. | |
| 6,424,270 B1 | 7/2002 | Ali | |
| 7,126,493 B2 * | 10/2006 | Junker et al. ............. | 340/870.02 |
| 2006/0033488 A1 | 2/2006 | Gandhi | |

* cited by examiner

Primary Examiner — Robert L. Deberadinis
(74) Attorney, Agent, or Firm — Maginot, Moore & Beck (57) ABSTRACT

A utility meter comprises a measurement circuit configured to measure consumption, a remote communications port, a local communications port, and a meter communications indicator. The meter communications indicator is configured to provide an indication that the meter is communicating with a remote device external to the meter over the remote communications port. The meter communications indicator is also configured to provide an indication that the meter is communicating with a local device external to the meter over the local communications port. The indication that communications are occurring over the local communications port is different from the indication that communications are occurring over the remote communications port. In at least one embodiment, the communications indicator is configured to provide an indication that communications are occurring simultaneously over the remote communications port and the local communications port.

20 Claims, 6 Drawing Sheets

REMOTE COMMUNICATIONS FEEDBACK FOR UTILITY METER

FIELD

This application relates to the field of utility metering, and more particularly, to utility meters having external communications capability.

BACKGROUND

Utility meters typically include a metering circuit that is capable of measuring some aspect of a consumed utility commodity and a display that provides visual information regarding the measured consumption. For example, in a typical electricity meter, a metering circuit measures electrical energy delivered to a customer or load, and the display provides visual information regarding the measured energy data. Many modern utility meters employ electronic displays such as LCD or LED displays that are capable of displaying other information in addition to consumption data.

Many modern meters are also configured to communicate with external devices, including local devices external to the meter and remote devices external to the meter. The automatic meter reader is one example of a remote device that may communicate with a utility meter. When a meter is configured for communication with an automatic meter reading device commodity consumption data is delivered from the meter to the automatic meter reading device. Such meters will include a remote communications port which allows the meter to communicate with the remote device. Such remote communications may by wire or wireless transmissions. For example, the remote communications port may be connected to an rf transceiver capable of transmitting and receiving messages in a wireless fashion. As another example, the remote communications port may be connected to a telephone line or the internet, and transmit messages via a cable or other transmission line.

Meters capable of remote communications are typically also adapted for communications with local devices positioned on the exterior of the meter. Accordingly, many utility meters include a local port which allows an individual present at the meter to communicate with the meter without opening the meter. For example, the local port may be an optical port with an IR transceiver positioned in the optical port. With such an IR transceiver, the meter is adapted to communicate with a local device positioned near the meter and having a line-of-sight to the local port.

The term "local device" as used herein is intended to refer to a device configured to communicate with the meter when in contact with the meter, substantially adjacent to the meter, or within a line-of-sight of the meter, such as, for example, an IR device positioned within a few feet of the meter or a magnetic read switch positioned adjacent to the meter. Similarly, the term "local communications" is intended to refer to communications between a meter and a local device. By contrast, a "remote device" is intended to refer to a device that is not in contact with the meter, is not substantially adjacent to the meter, and is not within a line-of-sight of the meter, such as, for example, an rf automatic meter reader positioned hundreds or thousands of feet away from the meter and capable of rf communications with the meter, or a computer located miles away from the meter but connected to the meter via the internet or telephone lines. The term "remote communications" is intended to refer to communications between a meter and a remote device.

Utility meters capable of external communications, including local and remote communications, may include an annunciator which indicates that the meter is communicating with an external device. The annunciator may take the form of a light or some other indicator that shows that the meter is communicating with the external device.

When an individual with a local device is attempting to establish a communication session with a meter over the local port, it can be difficult to discern by looking at the annunciator whether the communication session has been established. In particular, the annunciator may indicate that the meter is communicating with an external device, but will not indicate whether this device is a remote device or a local device. Accordingly, when an individual with a local device is attempting to establish a communication session with the meter over the local port, it can be difficult to distinguish whether an established communication session has been established for the local device, since the same communications indicator is provided for both local and remote communications. Accordingly, it would be advantageous to provide a utility meter with an improved external communications indicator.

SUMMARY

A utility meter comprises a measurement circuit configured to measure consumption, a remote communications port, a local communications port, and a meter communications indicator. The meter communications indicator is configured to provide an indication that the meter is communicating with a remote device external to the meter over the remote communications port. The meter communications indicator is also configured to provide an indication that the meter is communicating with a local device external to the meter over the local communications port. The indication that communications are occurring over the local communications port is different from the indication that communications are occurring over the remote communications port.

In at least one embodiment, the communications indicator of the utility meter is configured to provide an indication that communications are occurring simultaneously over the remote communications port and the local communications port.

In at least one embodiment, the communications indicator includes a first light, such as an LED, visible on the exterior of the meter. The first light provides the indication that communications are occurring over the remote communications port. The communications indicator may also comprise a second light visible on the exterior of the meter. The second light provides an indication that communications are occurring over the local communications port.

In at least one embodiment, the meter communications indicator includes a meter display. The meter display is configured to display consumption data from the measurement circuit. The meter display may be configured to provide an indication that communications are occurring over the remote communications port. In addition, the meter display may also be configured to provide an indication that communications are occurring over the local communications port. Furthermore, the meter display may be configured to provide an indication that communications are occurring simultaneously over the remote communications port and the local communications port.

The above described features and advantages, as well as others, will become more readily apparent to those of ordinary skill in the art by reference to the following detailed description and accompanying drawings. While it would be desirable to provide a utility meter that provides one or more of the above-mentioned advantageous features, or other advantages as may be apparent to those reviewing this disclosure, the teachings disclosed herein extend to those embodiments which fall within the scope of the appended claims, regardless of whether they accomplish one or more of the above-mentioned features or advantages.

DESCRIPTION

Figure 1:
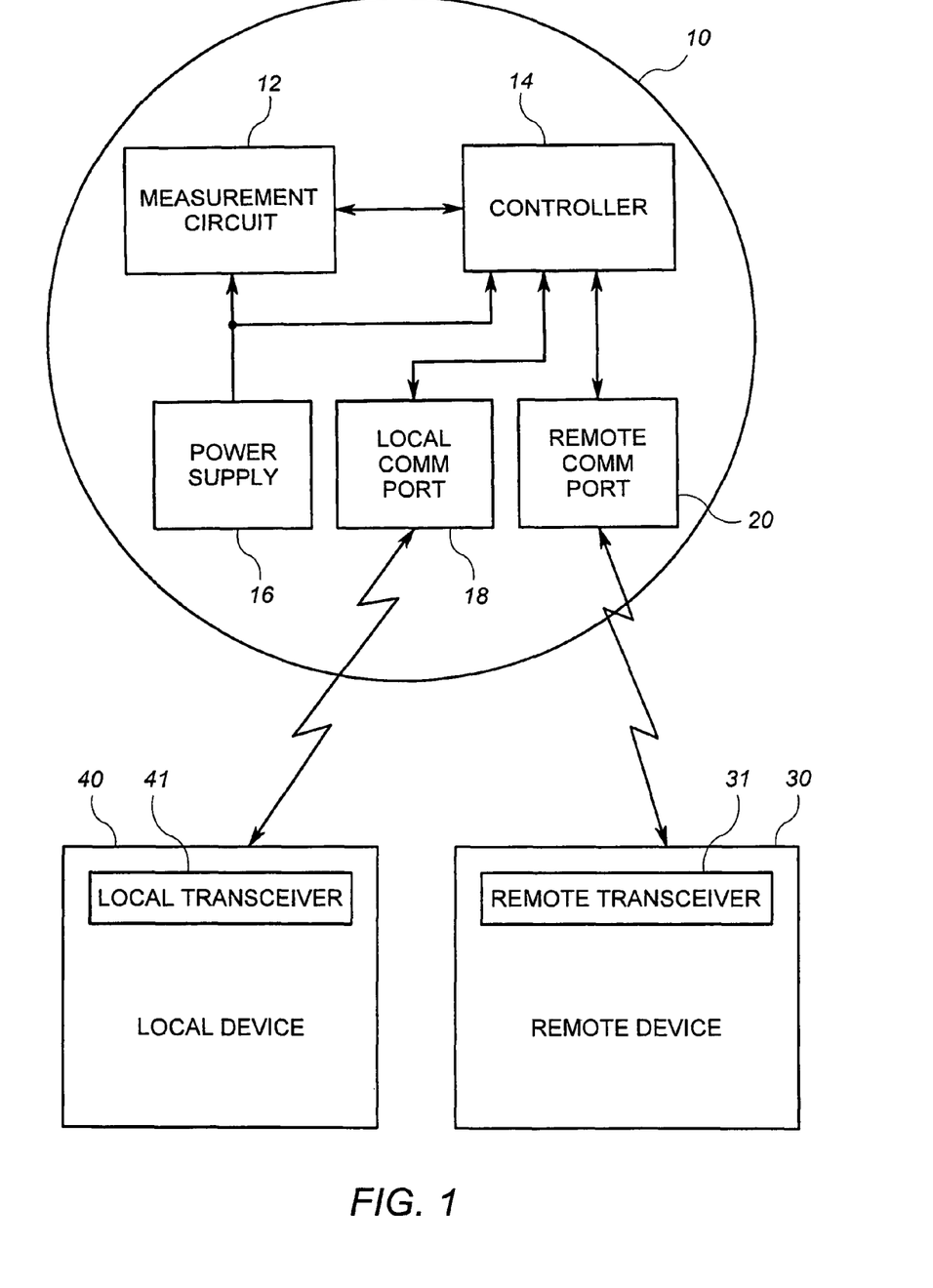
FIG. 1 shows a block diagram of a utility meter in communication with external devices.

With reference now to the drawings, FIG. 1 shows an exemplary utility meter 10 in communication with a local device 40 and a remote device 30. In general the local device 40 and the remote device 30 are configured to communicate data to and/or from the utility meter 10.

The utility meter 10 includes metrology circuitry in the form of a measurement circuit 12, a controller 14 with memory, a power supply 16, a local communications port 18, and a remote communications port 20. It will be appreciated that the utility meter 10 may optionally include other devices such as other communication circuitry, an electronic or mechanical display, and other peripheral devices commonly available in utility meters.

The exemplary remote device 30 includes a transceiver 31 that is operable to transmit data to or receive data from the utility meter 10. Accordingly, the remote device 30 may transmit and receive data through a wireless transmission, such as an RF transmission. Alternatively, the remote device 30 may transmit and receive data via a wired connection, such as a cable or fiber optic connection (e.g., internet, telephone, etc.). The remote device 30 is external to the utility meter, and may be any of numerous devices, such as, for example, a handheld meter reading device, a mobile computer, or a stationary computer located at particular location, such as the offices or production plant of a utility. One example of a remote device 30 is an automatic meter reader device configured to communicate with the meter over a substantial distance.

The exemplary local device 40 includes a transceiver 41 that is operable to transmit data to or receive data from the utility meter 10. Accordingly, the local device 40 may transmit and receive data through a wireless transmission, such as an IR transmission. Alternatively, the local device may transmit and receive data via a wired connection, such as through a short cable connected between the local device 40 and the meter 10. The local device 40 is external to the utility meter 10, and may be any of numerous devices, such as, for example, a handheld diagnostics device.

The utility meter 10 includes a measurement circuit 12 that generates utility consumption data. The utility consumption data may be in the form of digital signals, such those as used within processing circuitry, or may include pulses representative of a particular quantity of commodity consumed. For example, in water and gas meters, circuitry connected to flow metering devices generates pulse signals, each of which represents a certain amount of flow. In electricity meters, the measurement circuit 12 may include one or more processing devices that calculate energy consumption data from measured current and voltage signals. Measurement circuits used in electricity, gas and water metering are known in the art.

The controller 14 is configured to manage meter consumption data received from the measurement circuit. The controller may display the meter consumption data, transmit the meter consumption data externally and/or store the meter consumption data in a meter memory. In addition to managing consumption data, the controller is further configured to manage other meter operations, including the management of meter security/access operations, data flow operations, data collection operations, data transmission operations, meter programming and other meter operations as will be recognized by those of skill in the art.

The power supply 16 is a device that generates bias power for the measurement circuit 12. In one example, the power supply 16 may be connected to the mains electrical power lines and generate bias power for the measurement circuit. However, the power supply 16 may alternatively derive power from batteries, light sources or the like. In accordance with embodiments of the present invention, the power supply 16 provides the power necessary to allow data communication between the measurement circuit 12 and the controller 14.

The local communications port 18 is connected to the controller 14 and provides a portion of the meter configured to communicate with the local communications device 40. Accordingly, the local communications port 18 includes a local transceiver circuit that is configured to send signals to and/or receive signals from the external local device 40. Similar to the transceiver 41 in the local device 40, the transceiver at the local communications port 18 may be configured for wireless or wired communications, In at least one embodiment, the transceiver in the local communications port is an IR transceiver operable to communicate with the local device 40, provided the local device is within a line-of-sight with the transceiver in the local communications port 18.

The remote communications port 20 is connected to the controller 14, and provides a portion of the meter configured to communicate with the remote communications device 30. Accordingly, the remote communications port 20 includes a remote transceiver circuit that is configured to send signals to and/or receive signals from the external remote device 30. Similar to the transceiver 31 in the remote device 30, the transceiver in the remote communications port 20 may be configured for wireless or wired communications. In at least one embodiment, the transceiver in the remote communications port 20 is an RF transceiver operable to communicate with the remote device 30 over a great distance, such as many miles.

Figure 2:
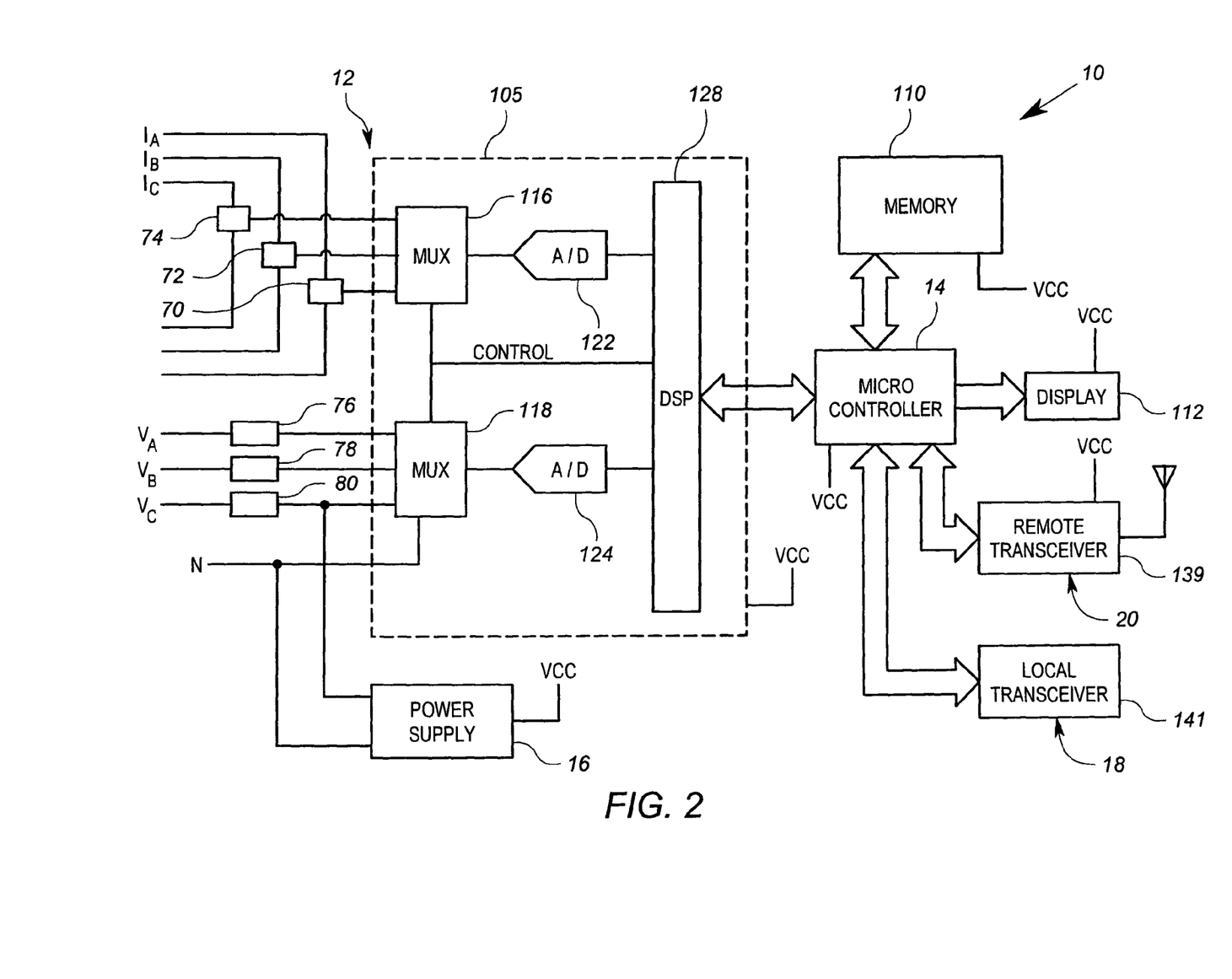
FIG. 2 shows a block diagram of the circuitry of the utility meter of FIG. 1.

FIG. 2 shows a more detailed view of an embodiment of the utility meter 10 of FIG. 1. For purposes of explanation and example only, the meter of FIG. 2 is shown as an electrical utility meter for monitoring three-phase electrical power. However, the principles disclosed herein are applicable to other types of meters, electrical meters and otherwise.

In FIG. 2, the exemplary meter 10 is a meter intended to, among other things, measure power consumption by a load (not shown) connected to an electric utility service provider (not shown). The exemplary meter 10 includes polyphase current sensors 70, 72 and 74 and polyphase voltage sensors 76, 78 and 80. The meter 10 further includes a conversion circuit 105, a processor or microcontroller 14, a memory circuit 110, a display 112, and communication devices. The communication devices include a local transceiver 140 positioned in the local communication port 18 (see FIG. 1) and a remote transceiver 130 positioned in the remote communication port 20 (see FIG. 1).

The conversion circuit 105 comprises a first multiplexer 116, a second multiplexer 118, a first analog-to-digital ("A/D") converter 122, a second A/D converter 124, and a digital signal processor ("DSP") 128. It will be noted that a three-phase electrical utility meter is given by way of example only. Those of ordinary skill in the art may readily adapt the inventive aspects of the disclosed embodiment to other types of meters, such as single phase or network meters.

The meter 10 further includes a power supply 16 that is configured to generate bias power for the conversion circuit 105, the controller 14, the memory circuit 110, the display 112, and the transceivers 131, 141. Such a power supply 16 may suitably be a switched mode power supply circuit that converts line voltage received from one of the mains electrical power lines to suitable DC bias voltages. Such circuits are known to those of ordinary skill in the art.

The current sensors 70, 72 and 74 are each connected to receive signals indicative of the current flowing through one phase of a three phase power line (i.e., phase A, phase B, and phase C). The current sensors 70, 72 and 74 of the exemplary embodiment described herein preferably each include transformers (not shown in FIG. 2), which are advantageously situated to detect current on each respective phase of the power line. The current sensors 70, 72 and 74 are further connected to the conversion circuit 105 through the first multiplexer 116.

The voltage sensors 76, 78 and 80 are each connected to the respective phase of the power line (i.e., phase A, phase B, and phase C) to obtain a voltage measurement therefrom. To this end, the voltage sensors 76, 78 and 80 may suitably comprise high resistance voltage dividers. Alternatively, the voltage sensors 76, 78 and 80 may be potential transformers. The voltage sensors 76, 78 and 80 are further connected to the conversion circuit 105 through the second multiplexer 118.

The conversion circuit 105 is a circuit operable to receive polyphase voltage and polyphase current measurement signals and generate digital signals therefrom, the digital signals including a power consumption signal and voltage and current signals. In the exemplary embodiment described herein, the conversion circuit 105 comprises first and second multiplexers 116 and 118, respectively, the first and second A/Ds 122 and 124, respectively, and the DSP 128. The above listed components of the conversion circuit 105 may suitably be incorporated onto a single semiconductor substrate.

The controller 14 is operably configured to, and executes programming instructions to, receive the digital signals from the conversion circuit 105, monitor and record power consumption using the digital signals, and analyze the digital voltage and current measurement signals and associated phase angle data to determine whether one or more measurement errors is present. The controller 14 may suitably be, for example, a K0 series microcontroller available from NEC. However, the controller 108 may alternatively comprise any other suitable processing device or circuit. The controller 108 generally includes firmware, or in other words, an integrated memory into which programming instructions are stored. Alternatively, the programming instructions may be stored in the memory 110.

The memory 110 is configured to store data, and the controller 108 is configured to deliver data to the memory or retrieve data from the memory. Through the microcontroller 14, the memory 110 is configured to communicate data to and/or from the measurement circuit 12. In addition, via the microcontroller 14, the memory 110 is further configured to communicate data to and receive data from the remote and local transceivers 130, 140.

The meter display 112 is typically an electrical display, such as the seven-segment or sixteen-segment LCD or LED display. These and other common displays for utility meters will be recognized by those of ordinary skill in the art. In one embodiment, the display 112 is comprised of a plurality of sections, such as a first section comprised of seven-segment display characters and a second section comprised of sixteen-segment display characters. Different types of data may be displayed in each of the sections of the display, such as identifiers in one section and associated numerical data in another section. The different segments may include different sized characters to assist the reader in quickly distinguishing one segment from another segment. Such multiple-section displays will also be recognized by those of ordinary skill in the art. The display 112 is typically used to show metrology data, including usage information related to the utility meter. For example, in an electricity meter, usage information may include instantaneous demand metering, total interval usage, total billing period usage, current pricing per unit consumed, etc.

Figure 3:
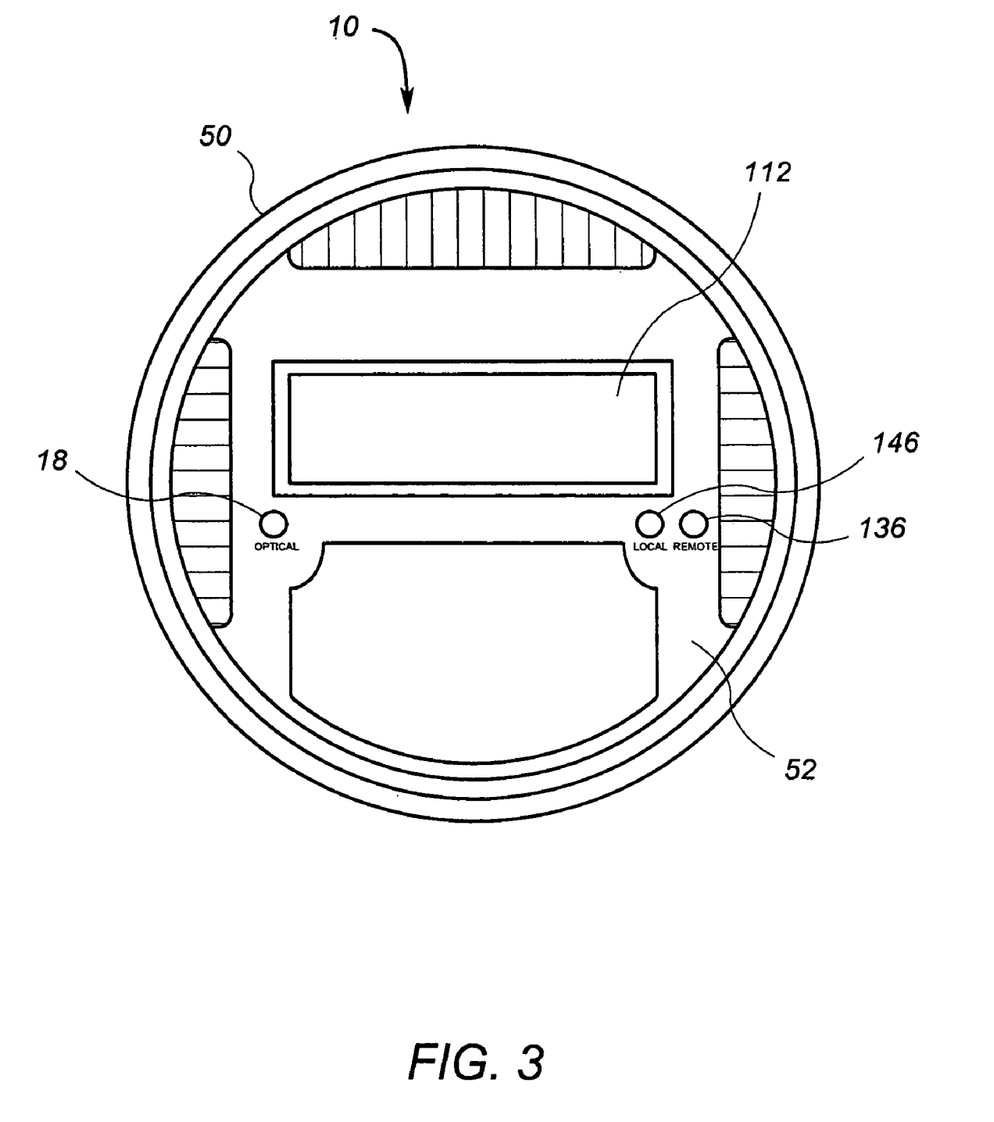
FIG. 3 shows an exemplary external view of the utility meter of FIG. 2 including a meter communications indicator visible on the face of the housing.

With reference now to FIG. 3, an exterior face 52 of a utility meter is shown. The face 52 is provided as part of a meter housing 50 that is configured to house the exemplary meter 10 of FIG. 2. The meter housing 50 is provided to cover the interior components of the meter 10 and shield the components from the environment as well as other exterior forces.

As shown in FIG. 3, the meter display 112 is provided on the face 52 of the meter housing 50, allowing the display 112 to be read from the exterior of the housing 50. The local communications port 18 is also visible on the face 52 of the meter 10. The local transceiver, typically in the form of an optical transceiver, is provided in the local communications port 18. The local communications port 18 is configured to receive signals from a local device positioned near the meter, such as a handheld optical communications device. The local communications port 18 is further configured to deliver signals to the local device. Accordingly, a service technician, meter reader, or other person with a local communications device may communicate with the meter through the local communications port 18.

The remote communications port 20 is typically not visible at the exterior of the meter. For example, the remote communications port 20 positioned on the inside of the housing may be connected to the internet or a telephone line over a cable connection. Alternatively, if the remote communications port 20 is configured for wireless rf communications, an antenna 132 (see FIG. 2) may be connected to the remote transceiver 20 in the meter 10. The antenna 132 is typically contained within the meter housing 50, and rf communications between the meter and the remote device are transmitted through the meter housing 50. However, in other embodiments using remote rf communications, the antenna 132 connected to the remote communications port 20 may extend out of the housing. Meters with such extended antennas may be desirable where the meter must communicate with a remote device over very long distances (e.g., five miles or more).

The meter housing of FIG. 3 is configured with two LEDs 136, 146 which together provide an annunciator that serves as a meter communications indicator. In particular, the LEDs 136, 146 are used to indicate whether the meter is communicating with a local device or a remote device, or both. If the meter has established communications with a local device 40 through the local communications port 40 (e.g., via the local transceiver 41), LED 146 is illuminated. If the meter has established communications with a remote device 30 through the remote communications port 30 (e.g., via the remote transceiver 31), LED 136 is illuminated. If communications are simultaneously established with both the remote device 30 and the local device 40, both LEDs 136, 146 are illuminated. In this manner, an individual present at the meter can determine whether the meter has established communications with a local device, a remote device, or both.

Figure 4:
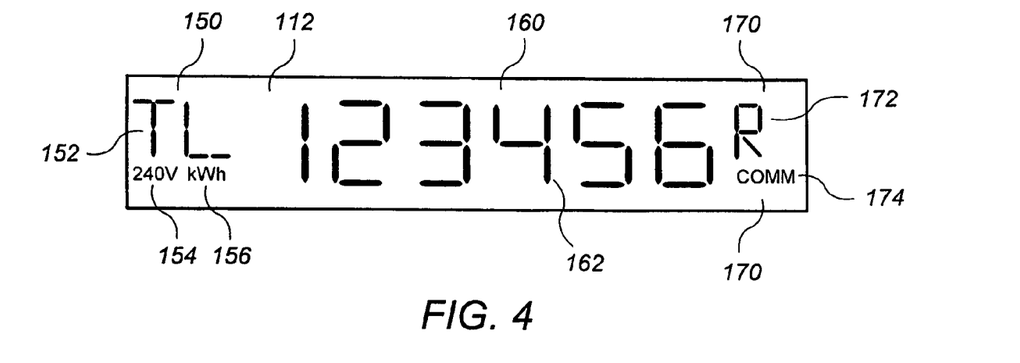
FIG. 4 shows an exemplary display for the utility meter of FIG. 2 with a meter communications indicator included as part of the display.

In at least one alternative embodiment, the meter communications indicator may be provided on the display 112 instead of other locations on the exterior of the meter 50. FIG. 4 shows an exemplary meter display 112 where the meter communications indicator is provided on the display. As shown in FIG. 4, the meter display includes a plurality of sections, including a left section 150, a center section 160, and a right section 170. The left section 150 of the display is comprised of two sixteen segment electronic displays 152 (e.g., LEDs or LCDs), a "240V" service level indicator 154, and a "kWh" indicator 156. The two sixteen segments displays 152 are configured to display a two character identifier related to a value shown in the center section 160 of the display. For example, in FIG. 4, the left section 150 of the display 112 shows the identifier "TL" which indicates that a total energy consumed is being displayed in the center section 160 of the display 112, The left section 150 further shows a level of service of "240V" and a unit measurement of "kWh".

The center section 160 of the display is comprised of six 7-segment electronic displays 162. In the example of FIG. 4, the center section 160 shows a total energy consumption measurement of "123456". Again, because the indicators "TL" 152 and "kWh" 156 are displayed in the left section 150 of the display 112, one viewing the measurement of "123456" will have an indication that this value is the total energy consumption measured by the meter in kilowatt-hours.

The display 112 is configured to show different types of information in the left section 150 and associated center section 160 of the display according to a meter display routine. For example, the display 112 may be configured to cycle between a total energy consumption measurement and a firmware version display. In this case, the display 112 might shows the identifier "VR" in the left section 150, and "02.19" in the center section 160 (and no "kWh" shown in indicator 156), indicating that the meter is equipped with firmware version 2.19. The meter display operates according to the standard meter display routine, causing the display to periodically switch (e.g., every five seconds) between different types of information.

Figure 5:
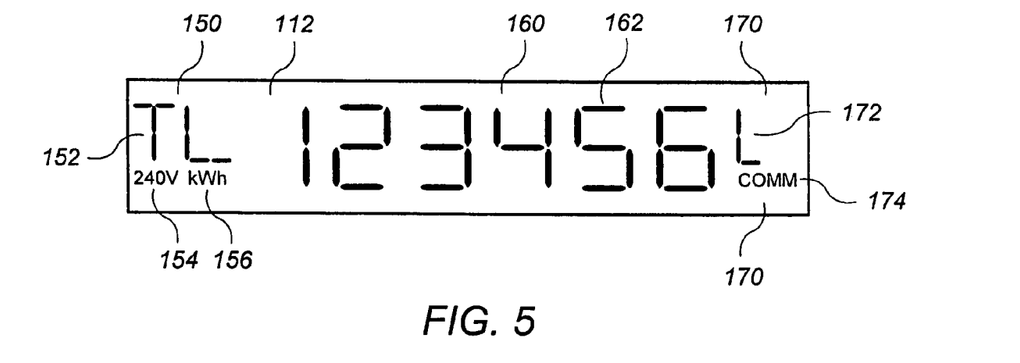
FIG. 5 shows the display of FIG. 4 with a different indication on the meter communications indicator.
Figure 6:
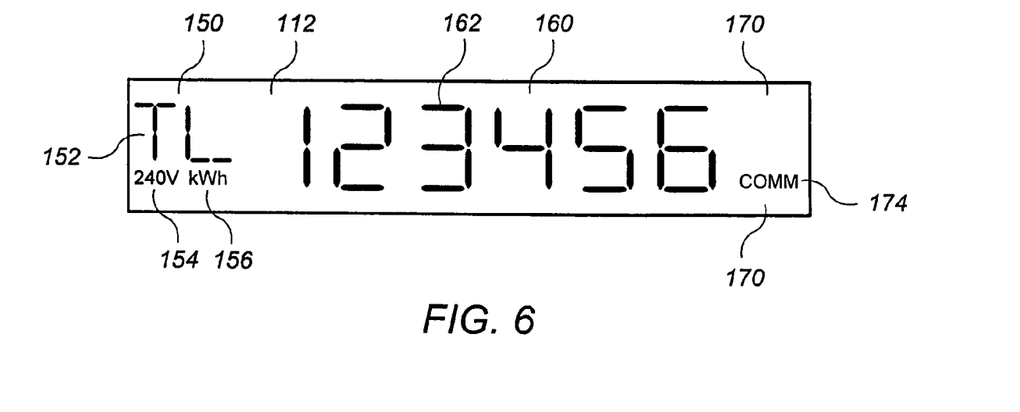
FIG. 6 shows the display of FIG. 4 with no indication on the meter communications indicator.

In the embodiment of FIG. 4, the right section 170 of the display 112 provides the meter communications indicator. In this embodiment, the meter communications indicator includes at least one electronic display 172 and a "COMM" indicator 174. The "COMM" indicator 172 is used to indicate that the right segment 170 of the display 112 is used to show communications status. However, if the electronic display 172 shows an "R", this indicates that the meter has established communications with a remote communications device. On the other hand, if the electronic display shows an "L", as shown in FIG. 5, this indicates that the meter has established communications with a local communications device. Furthermore, if the electronic display 172 is blank, as shown in FIG. 6, this indicates that the meter is not communicating with any devices at that time.

Figure 7:
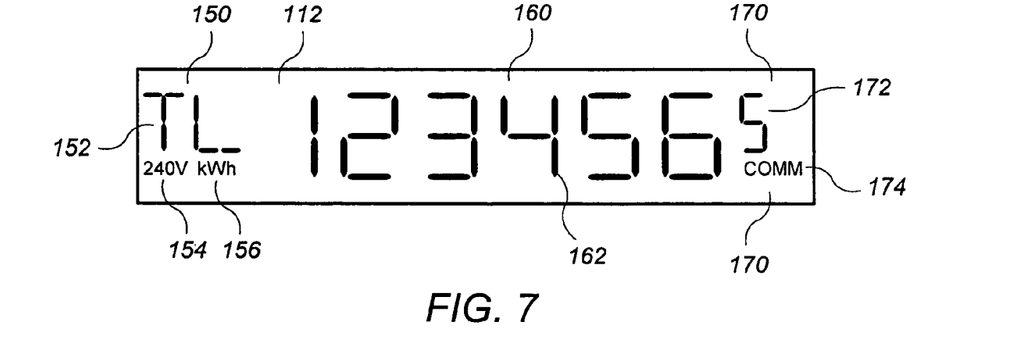
FIG. 7 shows the display of FIG. 4 with yet another indication on the meter communications indicator.

In addition to the above, the display 112 may also be configured to show that the meter is simultaneously communicating with a local device and a remote device. For example, in the embodiment of FIG. 7, an "S" is shown by electronic display 172. The "S" indicates that the meter is in simultaneous communications with both a local device and a remote device.

Figure 8:
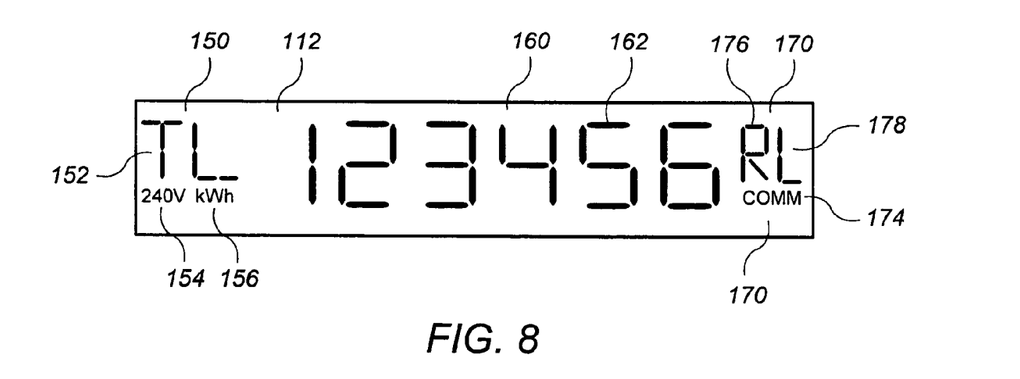
FIG. 8 shows yet another embodiment of the exemplary display for the utility meter of FIG. 2 with a communications indicator included as part of the display.

In yet another alternative embodiment shown in FIG. 8, the right section 170 of the display 112 includes two electronic displays 176, 178 (e.g., two seven or sixteen segment LEDs or LCDs). One electronic display 176 shows an "R" when communications have been established with a remote device. The other electronic display 178 shows an "L" when communications have been established with a local device. If only the "R" is shown, it can be seen that the meter is only communicating with either the remote device. Similarly, if only the "L" is shown, it can be seen that the meter is only communicating with the local device. However, if both the "R" and the "L" are shown on the right section 170 of the display 112, as shown in FIG. 8, it can be seen that the meter is simultaneously communicating with both the local and the remote devices.

Figure 9:
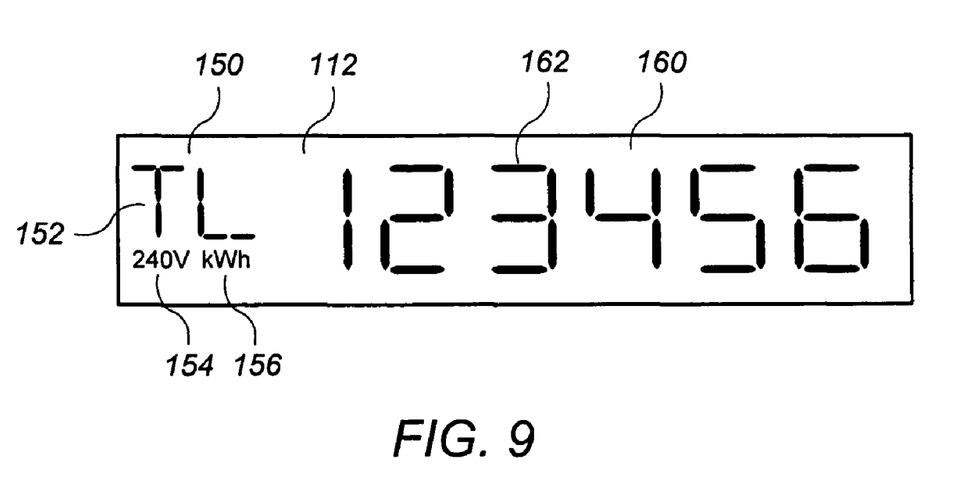
FIG. 9 shows another embodiment of the exemplary display for the utility meter of FIG. 2 with a communications indicator included on the left portion of the display.
Figure 10:
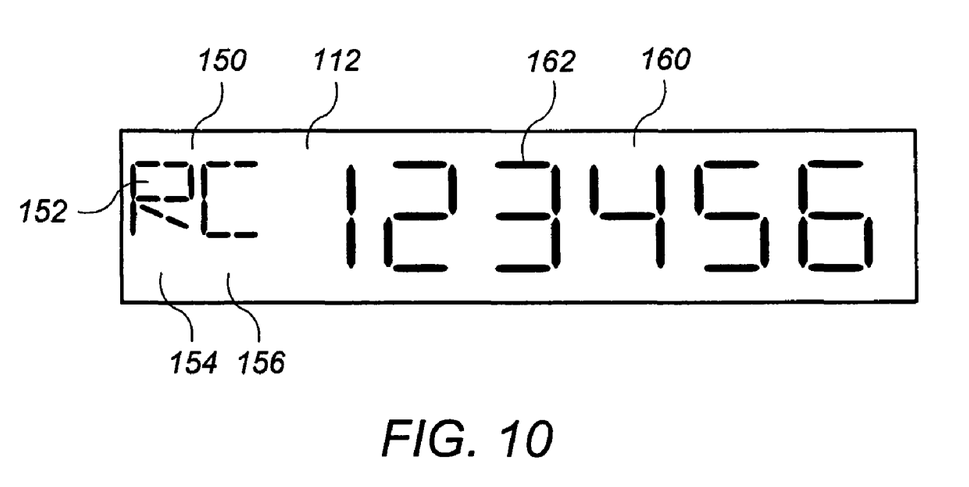
FIG. 10 shows the display of FIG. 9 with the communications indicator showing an alternate indicator.

FIGS. 9-10 show yet another alternative embodiment of the meter display 112 where the remote communications indicator is provided on the left section 150 of the display using indicators 154, 156. In this embodiment, the left section 150 of the display alternates between an indicator related to the main/center section 160 of the display and an indicator related to communications. For example, FIG. 9 shows the "TL" indicator in the left section 150 of the display 112 to indicate a total energy consumed being shown in the main/center section 160 of the display. After this is shown for a few seconds (e.g., 5 seconds), the left section 150 will alternate to the communications indicator, such as that shown in FIG. 10. FIG. 10 shows the "RC" indicator shown in the left section 150 of the display 112 to indicate that the meter is currently communicating with a remote device.

It will be recognized that the "TL" and "RC" indicators are merely examples of the indicators that may be used in the left section 150 of the display. For example, in order to show that the meter is currently communicating with a local device, the "P/R" (programming/reading) indicator may be used to indicate that the meter is communicating with a local device. Furthermore, in addition to alternating between two indicators (e.g., a first indicator related to the center display 160 and a second indicator related to communications), the left section 150 may also be configured to alternate its display between three or more indicators (e.g., a first indicator related to the center display 160, a second indicator related to remote communications, and a third display related to local communications).

Although various embodiments been presented herein, it will be appreciated by those of skill in the art that other implementations and adaptations are possible. For example, although certain meter communication indicators are shown herein, such as LEDs, LCDs, and alpha-numeric characters "R", "L", and "S" it will be recognized that other or different meter communication indicators could be utilized. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A method of operating a utility meter including a measurement circuit configured to measure consumption, a local communication port, a remote communication port and a meter display, the method comprising:
   a) displaying consumption data on the meter display;
   b) communicating with a local device external to the meter over the local communication port;
   c) indicating at the meter that the meter is communicating with the local device;
   d) communicating with a remote device external to the meter over the remote communications port, the remote device further removed from the meter than the local device; and
   e) indicating at the meter that meter is communicating with the remote device, wherein the indication that the meter is communicating with the remote device is different from the indication that the meter is communicating with the local device.

2. The method of claim 1 wherein the indication that the meter is communicating with the remote device is separate from the meter display.

3. The method of claim 2 wherein the indication that the meter is communicating with the remote device is provided by a light visible on the exterior of the meter.

4. The method of claim 3 wherein the indication that the meter is communicating with the local device is provided by a second light visible on the exterior of the meter.

5. The method of claim 1 wherein the indication that the meter is communicating with the remote device is provided on the meter display.

6. The method of claim 5 wherein the indication that the meter is communicating with the local device is also provided on the meter display.

7. The method of claim 1 wherein the indication that the meter is communicating with the remote device is a visual indication.

8. The method of claim 1 wherein the indication that the meter is communicating with the remote device is provided simultaneously with the indication that the meter is communicating with the local device.

9. The method of claim 1 further comprising the step of indicating at the meter that the meter is simultaneously communicating with the local device and the remote device.

10. A utility meter comprising:
    a measurement circuit configured to measure consumption of a utility commodity;
    a local communications port;
    a remote communications port; and
    a meter communications indicator, the meter communications indicator configured to provide an indication that communications are occurring over the remote communications port, the meter communications indicator further configured to provide an indication that communications are occurring over the local communications port, wherein the indication that communications are occurring over the local communications port is different from the indication that communications are occurring over the remote communications port.

11. The utility meter of claim 10 wherein the meter communications indicator is configured to provide an indication that communications are occurring simultaneously over the remote communications port and the local communications port.

12. The utility meter of claim 10 wherein the meter communications indicator includes a light visible on the exterior of the meter, the light providing the indication that communications are occurring over the remote communications port.

13. The utility meter of claim 12 wherein the meter communications indicator further comprises a second light visible on the exterior of the meter, the second light providing an indication that communications are occurring over the local communications port is provided by a second light visible on the exterior of the meter.

14. The utility meter of claim 10 wherein the meter communications indicator includes a meter display, wherein the meter display is configured to display consumption data from the measurement circuit and provide the indication that communications are occurring over the remote communications port.

15. The utility meter of claim 14 wherein the meter display is further configured to provide the indication that communications are occurring over the local communications port.

16. The utility meter of claim 15 wherein the meter display is further configured to provide an indication that communications are occurring simultaneously over the remote communications port and the local communications port.

17. The utility meter of claim 14 wherein the meter display is an LCD display.

18. The utility meter of claim 10 wherein the consumption commodity is electricity.

19. A utility meter comprising:
    a measurement circuit configured to measure consumption and provide consumption data;
    a remote communications port;
    a local communications port; and
    a meter communications indicator, the meter communications indicator configured to provide an indication that communications are simultaneously occurring over the local communications port and over the remote communications port.

20. A utility meter comprising:
    a measurement circuit configured to measure consumption;
    a local communication port;
    a remote communication port; and
    means for indicating that communications are simultaneously occurring over the local communications port and the remote communications port.

* * * * *